US010331732B1

(12) United States Patent
McClain et al.

(10) Patent No.: US 10,331,732 B1
(45) Date of Patent: Jun. 25, 2019

(54) INFORMATION SEARCHING SYSTEM (71) Applicant: National Technology & Engineering Solutions of Sandia, LLC, Albuquerque, NM (US)

(72) Inventors: Jonathan T. McClain, Albuquerque, NM (US); Fredrick Rothganger, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 96 days.

(21) Appl. No.: 15/381,632

(22) Filed: Dec. 16, 2016

(51) Int. Cl.
*G06K 9/00* (2006.01)
*G06F 16/583* (2019.01)
*G06K 9/72* (2006.01)
*G06K 9/34* (2006.01)

(52) U.S. Cl.
CPC ..... *G06F 16/5846* (2019.01); *G06K 9/00456* (2013.01); *G06K 9/344* (2013.01); *G06K 9/726* (2013.01)

(58) Field of Classification Search
CPC .............. G06F 17/30253; G06K 9/344; G06K 9/00456; G06K 9/726
See application file for complete search history.

(56) References Cited

U.S. PATENT DOCUMENTS

| | | | | | |
|---|---|---|---|---|---|
| 5,828,784 | A | * | 10/1998 | Miyashita | G06T 9/40 382/232 |
| 6,243,713 | B1 | * | 6/2001 | Nelson | G06F 17/30017 |
| 6,721,451 | B1 | * | 4/2004 | Ishitani | G06K 9/00469 382/175 |
| 2006/0085477 | A1 | * | 4/2006 | Phillips | G06F 17/30247 |
| 2007/0019864 | A1 | * | 1/2007 | Koyama | G06F 17/30247 382/218 |
| 2009/0116746 | A1 | * | 5/2009 | Neogi | G06K 9/00442 382/190 |
| 2011/0022609 | A1 | * | 1/2011 | Grover | G06F 17/30637 707/755 |
| 2011/0043869 | A1 | * | 2/2011 | Okajo | G06F 17/30247 358/474 |
| 2014/0314324 | A1 | * | 10/2014 | Tian | G06F 17/30247 382/197 |
| 2015/0161086 | A1 | * | 6/2015 | Wu | G06F 17/30247 715/234 |
| 2015/0220787 | A1 | * | 8/2015 | Folkens | G06F 17/30268 382/103 |
| 2015/0262007 | A1 | * | 9/2015 | Sesum | G06K 9/00469 382/177 |
| 2016/0140146 | A1 | * | 5/2016 | Wexler | G06F 17/30253 707/741 |
| 2017/0308550 | A1 | * | 10/2017 | Chiu | G06F 3/04842 |

\* cited by examiner

*Primary Examiner* — John B Strege
(74) *Attorney, Agent, or Firm* — Yee & Associates, P.C.; Gregory M. Doudnikoff (57) ABSTRACT

A method and computer system for searching a collection of documents. The method comprises first identifying text in the document and then identifying an image in the document. Then the features of the image are extracted from the document and image terms are identified from the features. Finally, the collection of documents is searched using the image terms in conjunction with text terms.

24 Claims, 11 Drawing Sheets

INFORMATION SEARCHING SYSTEM

GOVERNMENT LICENSE RIGHTS

This invention was made with United States Government support under Contract No. DE-AC04-94AL85000 between Sandia Corporation and the United States Department of Energy. The United States Government has certain rights to this invention.

BACKGROUND INFORMATION

1. Field

The present disclosure relates generally to an improved computer system and, in particular, to a method and apparatus for searching a collection of documents using text and images. Still more particularly, the present disclosure relates to a method and apparatus for searching a collection of documents using text and images described in a manner such that they are jointly searched via a technique originating in the text-analysis domain.

2. Background

Search engines are software systems that search for information on networks such as the Internet. In particular, the search engines are used to search for information on the World Wide Web. The searches may be performed in response to requests from users searching for information or as part of data mining operations.

Search engines may search for information on different websites or databases. This information may be obtained by searching for texts that matches a query.

In some cases, a user may desire to search for the presence of images in addition to text in documents. Searches may be performed to identify images that match an image that has been sent as a query. When an image is found in a document, the text near the image may not be related to the key words used in the search. As a result, the accuracy of search may not be as great as desired.

Therefore, it would be desirable to have a method and apparatus that take into account the relationships between images and surrounding text in a more structured manner.

SUMMARY

An embodiment of the present disclosure provides a method for searching a collection of documents. The method comprises first identifying text in the document and then identifying an image in the document. Then the features of the image are extracted from the document and image terms are identified from the features. Finally, the collection of documents is searched using the image terms in conjunction with text terms.

Another embodiment of the present disclosure provides a computer system. The computer system comprises a processor unit and a search engine. The search engine runs on the processor unit, wherein the search engine identifies text in a document, then identifies an image in the document. The search engine extracts the features in the image in the document, identifies the image terms for the features and searches a collection of documents using the image terms in conjunction with text terms identified from the text.

Yet another embodiment of the present disclosure provides a computer program product for searching a collection of documents. The computer program comprises a computer-readable storage media, a first program code, a second program code, a third program code, a fourth program code and a fifth program code. The first program code is stored on a computer-readable storage media and is used to identify text in a document. The second program code is stored on a computer-readable storage media and identifies an image in the document. The third program code is stored on a computer-readable storage media and extracts features in the image in the document. The fourth program code is stored on a computer-readable storage media and identifies image terms for the features. The fifth program code is stored on a computer-readable storage media and searches the collection of documents using the image terms in conjunction with text terms identified from the text.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account searching documents for text and images may not be as accurate as desired using current techniques.

Thus, the illustrative embodiments provide a method and apparatus for searching a collection of documents. In one example, text in a document is identified. The image in the document is also identified. Features in the image in the document are extracted. A feature is information which describes an object as it might be observed in a document. A document is an ordered list of features. In text, features occur as strings of characters separated by spaces. In an image, features occur as intensities of a small group (usually square) of neighboring pixels. A single document may contain regions of text and images interspersed.

Image terms are identified from the features. The collection of documents is searched using the image terms in conjunction with text terms.

Figure 1:
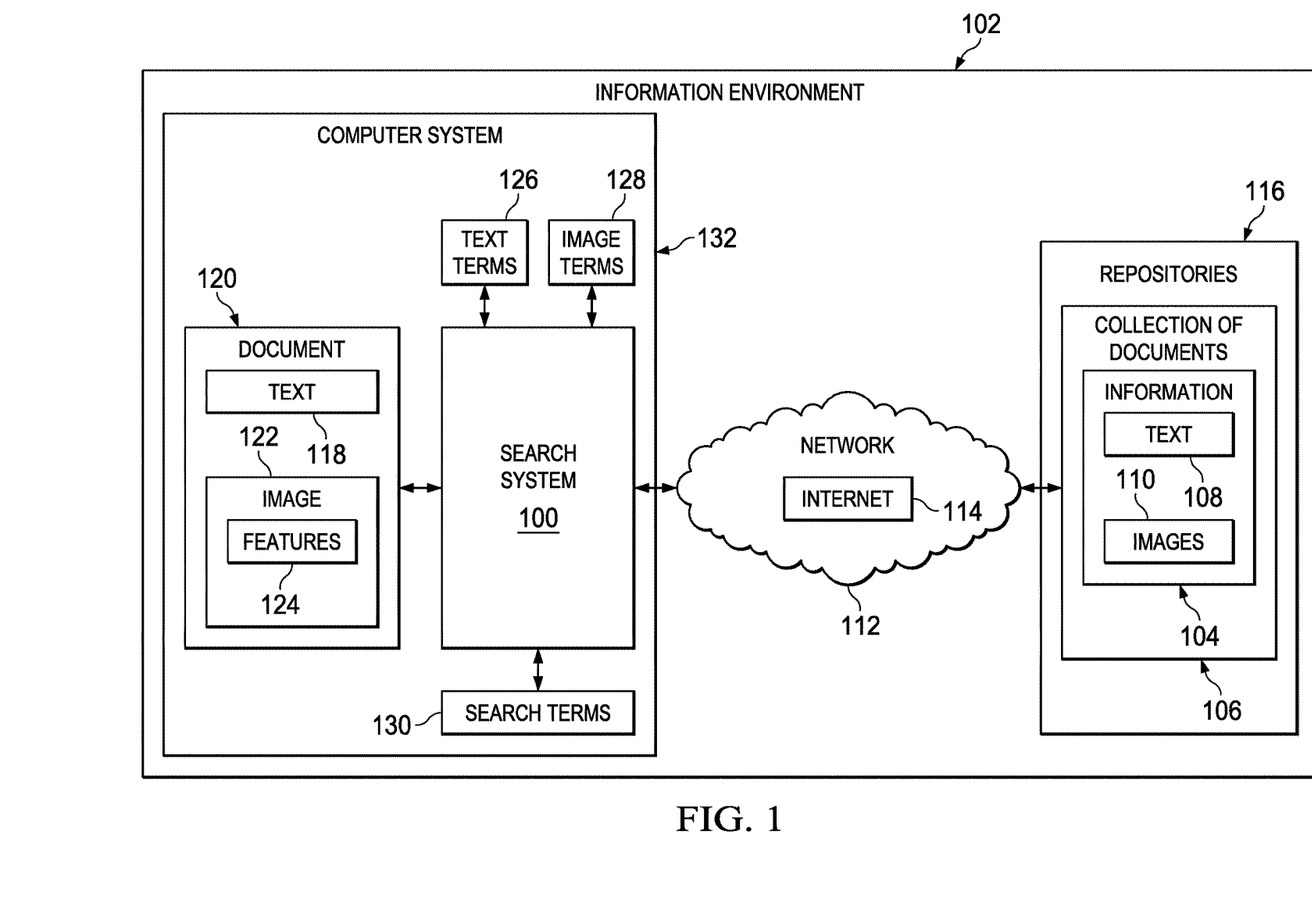
FIG. 1 is an illustration of a block diagram of an information environment in accordance with an illustrative embodiment.

With reference now to the figures and, in particular, with reference to FIG. 1, an illustration of a block diagram of an information environment is depicted in accordance with an illustrative embodiment. In this illustrative example, search system 100 in information environment 102 searches for information 104 in collection of documents 106.

Search system 100 may take a number of different forms. For example, search system 100 may include at least one of a search engine, a web crawler, a database mining process, or other types of processes that search for information 104 in collection of documents 106.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

In this depicted example, information 104 in collection of documents 106 may comprise at least one of text 108 or images 110. In this illustrative example, collection of documents 106 may be accessed through network 112. For example, network 112 is Internet 114 in this depicted example.

Collection of documents 106 may be stored on repositories 116. In this illustrative example, repositories 116 may be located in or connected to Internet 114. As depicted, repositories 116 may be selected from at least one of a website, a database, a proxy server, or some other suitable mechanism for storing and allowing access to collection of documents 106 over network 112.

In this illustrative example, search system 100 overcomes a technical problem with searching collection of documents 106 on network 112 in the form of Internet 114. In particular, one technical problem addressed by the illustrative example is searching for both text 108 and a group of images 110 that may be found in collection of documents 106. As used herein, a "group of" when used with reference items means one or more items. For example, a group of images 110 is one or more of images 110.

The illustrative example overcomes issues in which text 108, that may be proximate or within some distance of images 110, may not actually be related to or describe images 110. As depicted, search system 100 identifying text 118 in document 120. Search system 100 also identifies an image 122 in document 120. Features 124 in image 122 in document 120 are extracted by search system 100.

Search system 100 identifies text terms 126 from text 118 in document 120. Further, search system 100 identifies image terms 128 from features 124 in image 122. In this illustrative example, search system 100 combines text terms 126 and image terms 128 to form search terms 130. Text terms 126 and image terms 128 in search terms 130 are organized in a vector in this example. A vector is an ordered list of numbers, of a prescribed length.

Search system 100 searches collection of documents 106 using image terms 128 in conjunction with text terms 126. In other words, search system 100 combines text terms 126 and image terms 128 to form search terms 130. In this manner, searching collection of documents 106 may be performed using processes typically designed for text and not images.

Search system 100 may be implemented in software, hardware, firmware or a combination thereof. When software is used, the operations performed by search system 100 may be implemented in program code configured to run on hardware, such as a processor unit. When firmware is used, the operations performed by search system 100 may be implemented in program code and data, and stored in persistent memory to run on a processor unit. When hardware is employed, the hardware may include circuits that operate to perform the operations in search system 100.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, or other type of suitable hardware device. Additionally, the processes may be implemented in organic components integrated with inorganic components and may be comprised entirely of organic components, excluding a human being. For example, the processes may be implemented as circuits in organic semiconductors.

In the illustrative example, search system 100 may be located in computer system 132. Computer system 132 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

In one illustrative example, one or more technical solutions are present that overcome a technical problem with searching for documents using text and images. As a result, one or more technical solutions may provide a technical effect of at least one of increased accuracy for speed in searching collection of documents 106 for both text 108 and images 110.

As a result, computer system 132 operates as a special purpose computer system, in which search system 100 in computer system 132 enables a more efficient searching of documents containing text in images as compared to currently used techniques. In particular, search system 100 transforms computer system 132 into a special purpose computer system as compared to currently available general computer systems that do not have search system 100.

Computer system 132 performs a transformation of data. For example, search system 100 in computer system 132 transforms image 122 into image terms 128. This transformation of image 122 allows for image 122 to be searched in the same manner as text 108. As a result, both image 122 and text 108 may be searched together in the same grouping in which search terms 130 comprise text terms 126. As a result, the transformation of image 122 changes such that the data formed by search terms 130 has a different function or has a different use allowing for search terms 130 to be searched using searching techniques typically use for text.

Figure 2:
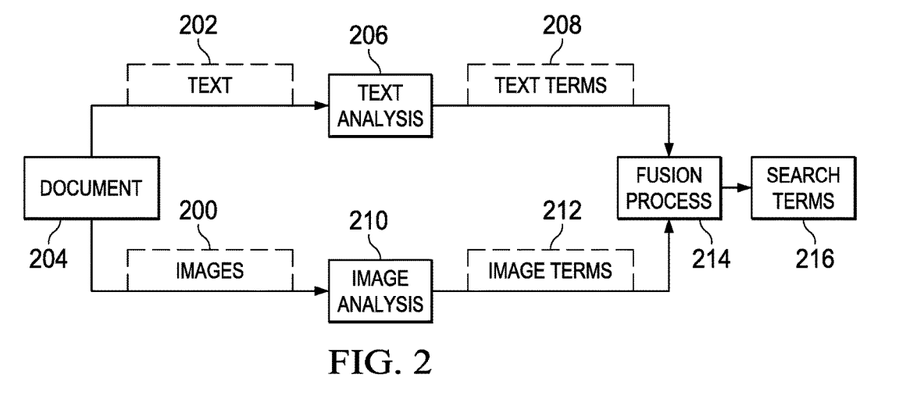
FIG. 2 is an illustration of a data flow used in generating search terms from a document containing text and images in accordance with an illustrative embodiment.

With reference to FIG. 2, an illustration of a data flow used in generating search terms from a document containing text and images is depicted in accordance with an illustrative embodiment. The data flow shown in FIG. 2 is implemented in search system 100 in FIG. 1. The data flow is used to generate search terms for use in searching documents. In this illustrative example, images 200 and text 202 are extracted from document 204.

Text analysis 206 is performed on text 202 to generate text terms 208. Text analysis 206 may implement any currently used text-analysis process for identifying text terms 208 for use in search documents. Image analysis 210 is performed on images 200 to generate image terms 212 from images 200.

In this illustrative example, text terms 208 and image terms 212 are combined by fusion process 214 to form search terms 216. In other terms, fusion process 214 puts both text terms 208 and image terms 212 into a grouping.

Search terms 216 allow for searches of a collection of documents 204 to be made using currently available word searching processes. By transforming images 200 into image terms 212, images 200 may be searched in conjunction with text 202 using a text searching process.

As depicted, search terms 216 are not required to have any particular order. In essence, search terms 216 may be considered a bag of words that may be used for searching other documents using text searching processes without needing any particular order.

More precisely, the order of search terms 216 in the source document is unimportant. On the other hand, the order of search terms 216 in the vector is used to make comparisons. For example, a dictionary is present that establishes the recognizable terms. A vector of counts ("doc-term vector") contains search terms 216 in an order. The first number in the vector of counts is associated with the first term in the dictionary. The second number in the vector is associated with the second term in the dictionary, and so on. For each document, a doc-term vector is generated. To perform a search, the doc-term vector for the query doc is compared against the doc-term vector for each document in collection of documents 106 in FIG. 1.

A doc-term vector is an ordered list of counts associated with a given dictionary. The doc-term vector is not part of the dictionary but generated using the dictionary in these examples. A doc-term matrix is a two-dimensional arrangement of numbers, where each row is associated with a distinct document, and each column is associated with a position in the given dictionary.

In the illustrative example, the dictionary is an ordered collection of terms. A term is an entity in the dictionary. In one illustrative example, a term has no meaning beyond the position of the term in the dictionary.

The collection of doc-term vectors is generally called the "doc-term matrix", where each row is associated with a given document, and each column is associated with a position in the dictionary.

Figure 3:
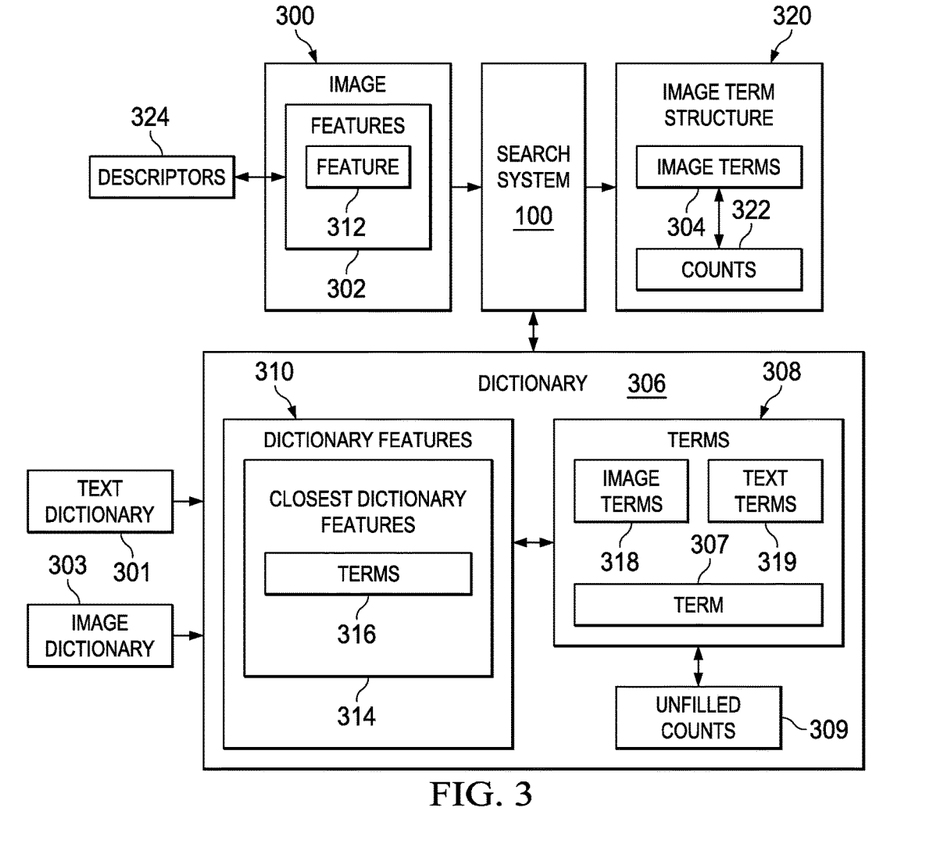
FIG. 3 is an illustration of a block diagram identifying image terms in accordance with an illustrative embodiment.

With reference now to FIG. 3, an illustration of a block diagram identifying image terms is depicted in accordance with an illustrative embodiment. In the illustrative examples, the same reference numeral may be used in more than one figure. This reuse of a reference numeral in different figures represents the same element in the different figures.

In this depicted example, image 300 is an example of an image in images 110 in FIG. 1 and images 200 in FIG. 2. Search system 100 uses features 302 extracted from image 300. Image terms 304 are identified from features 302 by search system 100 using dictionary 306. Dictionary 306 is a set of terms. Each term is associated with a single feature. The distance between features is measured and the closest feature to the query causes its associated term in dictionary 306 to be selected.

Dictionary 306 comprises terms 308 that correspond to dictionary features 310. Features 302 are looked up in dictionary 306 to identify dictionary features 310 that are closest to features 302. An exact match between all of features 302 and dictionary features 310 may not be present. The closest match of dictionary features 310 to features 302 are used to identify terms 308.

For example, feature 312 is compared to dictionary features 310. If an exact match between the terms is not present between feature 312 and term 307 in terms 308, closest dictionary feature 314 to feature 312 is used. Terms 308 corresponding to closest dictionary feature 314 are identified as image terms 304 for closest dictionary features 314. Terms 316 also includes text terms 319 for text.

As depicted, image terms 304 are located in image term structure 320. Image term structure 320 contains image terms 304 identified for features 302 in image 300 using terms 308 in dictionary 306. In other words, each image term in image term structure 320 corresponds to a term in dictionary 306. In addition to containing image terms 304, counts 322 are present for image terms 304 in image term structure 320. Counts 322 are counts that identify how many times each image term is present in image 300.

In this illustrative example, features 302 are described using descriptors 324 that may take the form of scale-invariant feature transform (SIFT) descriptors. Scale-invariant feature transform (SIFT) descriptors are generated using a scale-invariant feature transform algorithm in computer vision that detects and describes local features in images. These descriptors may be compared to dictionary features 310, which also take the form of scale-invariant feature transform (SIFT) descriptors. While scale-invariant feature transform (SIFT) descriptors are used in this depicted example, other types of descriptors may be used. For example, any type of vector-based image descriptor may be used in another illustrative example.

In this example, scale-invariant feature transform (SIFT) descriptors are divided up into clusters using hierarchical K-Means clustering. The centroids of each cluster are used to identify image terms 308 using dictionary 306.

In the illustrative example, dictionary 306 is a template for a form used to create image term structure 320. For example, dictionary 306 also has unfilled counts 309, which are filled from count 322. In some cases, an image term in image terms 304 may have a count of zero Turning to FIG. 4, an illustration of a block diagram of subdividing an image is depicted in accordance with an illustrative embodiment. In FIG. 3, image 300 has been processed as a whole to identify image terms 304 in image term structure 320. Image 300 has a spatial structure. Further, image 300 may be repeatedly divided into regions 400 that have grid pattern 402 to form levels 404. Each level has a distinct grid pattern as compared to other levels in levels 404. In the illustrative example, the grid spacing in grid pattern 402 follows powers of 2. For example, first divide the image in half along each dimension (grid with 4 cells total), then divide in quarters along each dimension (grid with 16 cells total), and so on for each successive level.

In the illustrative example, a grid is a division of an image into equally-sized cells (rectangles). Division is such that the combination of cells from a given grid covers the entire surface of the image exactly, without overlap.

Figure 4:
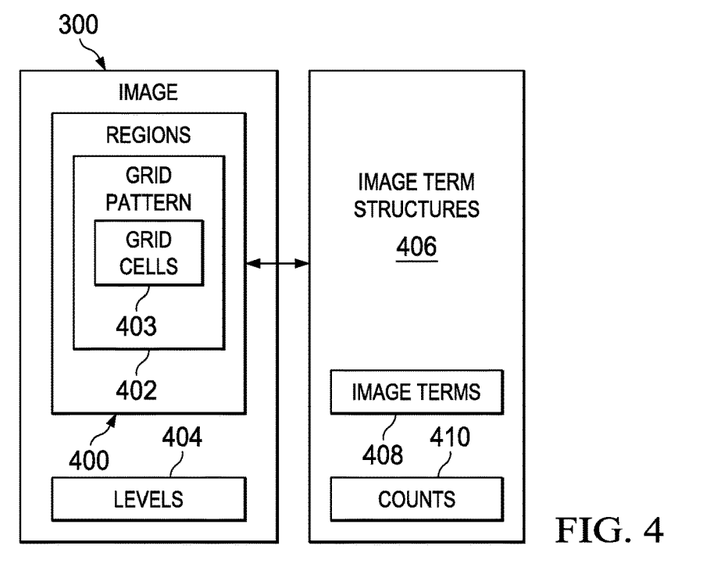
FIG. 4 is an illustration of a block diagram of subdividing an image in accordance with an illustrative embodiment.

Levels 404 may be scaled such that each successive level in levels 404 has more levels with smaller regions than a prior level in levels 404. In this example, the divisions may be made using a scale factor.

Image term structures 406 are present for regions 400. Image term structures 406 have image terms 408 and counts 410.

Each region in regions 400 has an image term structure in image term structures 406 that describe image terms and counts of image terms in the region. For example, if counts 410 in levels 404 have four regions in regions 400, four image term structures are present in image term structures 406 for counts 410.

In this illustrative example, image 300 contains a set of levels 404. As used herein, a "set of" when used with reference to items means one or more items. For example, set of levels 404 is one or more levels.

As depicted, each level within the set of levels 404 is a set of regions in regions 400. Each grid cell in in grid cells 403 are associated with an image structure in image term structures 406. These image structures take the form of doc-term vectors in image terms 408 in these examples.

Each image term structure in image term structures 406 corresponds to an image or a different division of the same image. Each entry in an image term structure contains terms and counts for the terms for a grid cell.

The illustration of information environment 102 and the different components in FIGS. 1-4 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, as shown in FIG. 1, collection of documents 106 may include information 104 in other forms in addition to or in place of text 108 or images 110. For example, information 104 may also include video, audio, or other suitable forms of information 104.

Dictionary 306, as shown in FIG. 3, may also include terms 308 that may be used to identify text terms. The count of these text terms in a document may also be identified to form a text term structure that may be combined with image term structure 320 to form search terms for searching documents.

In other words, dictionary 306 is formed from a combination of dictionaries from different domains (i.e. text, image, etc.) which in turn create a structure for term counts which cross the domains between text and images. In this example, dictionary 306 is a combination of text dictionary 301 and image dictionary 303. Each of these dictionaries contains terms. Text dictionary 301 contains terms generated from text in a document. Image dictionary 303 contains terms generated from features for images in a document. Dictionary 306 also may include other domains in addition to or in place of the one shown in this figure. For example, phonemes for audio may be another domain.

In these illustrative examples, the use of image term structures 406 for different levels in levels 404 provide for special structuring and in the analysis of image 300. Further, in a similar fashion, image term structures 406 may include terms for both text and image domains.

Figure 5:
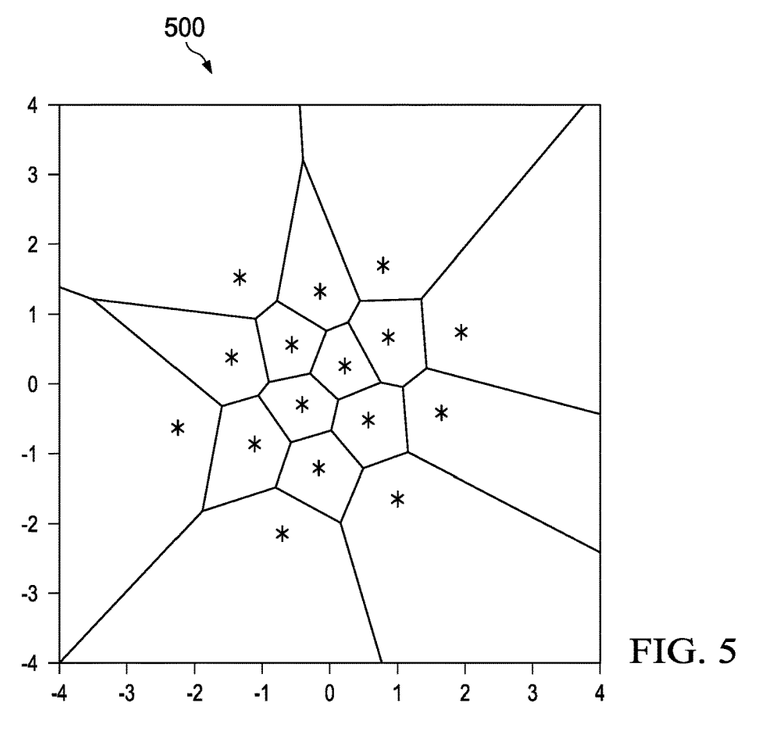
FIG. 5 is an illustration of identifying image terms in a dictionary in accordance with an illustrative embodiment.

With reference to FIG. 5, an illustration of identifying image terms in a dictionary is depicted in accordance with an illustrative embodiment. In this depicted example, graph 500 is a visualization of image terms in a dictionary, such as dictionary 306 in FIG. 3.

The regions in graph 500 represent dictionary terms that are scale-invariant feature transform (SIFT) descriptors. The dots in graph 500 represent the centroids for the regions.

A scale-invariant feature transform (SIFT) descriptor for a feature in an image, such as image 300 in FIG. 3, may be compared to graph 500 in which the feature falls into a region. The feature is identified as having an image term corresponding to the dictionary term for the region.

Figure 6:
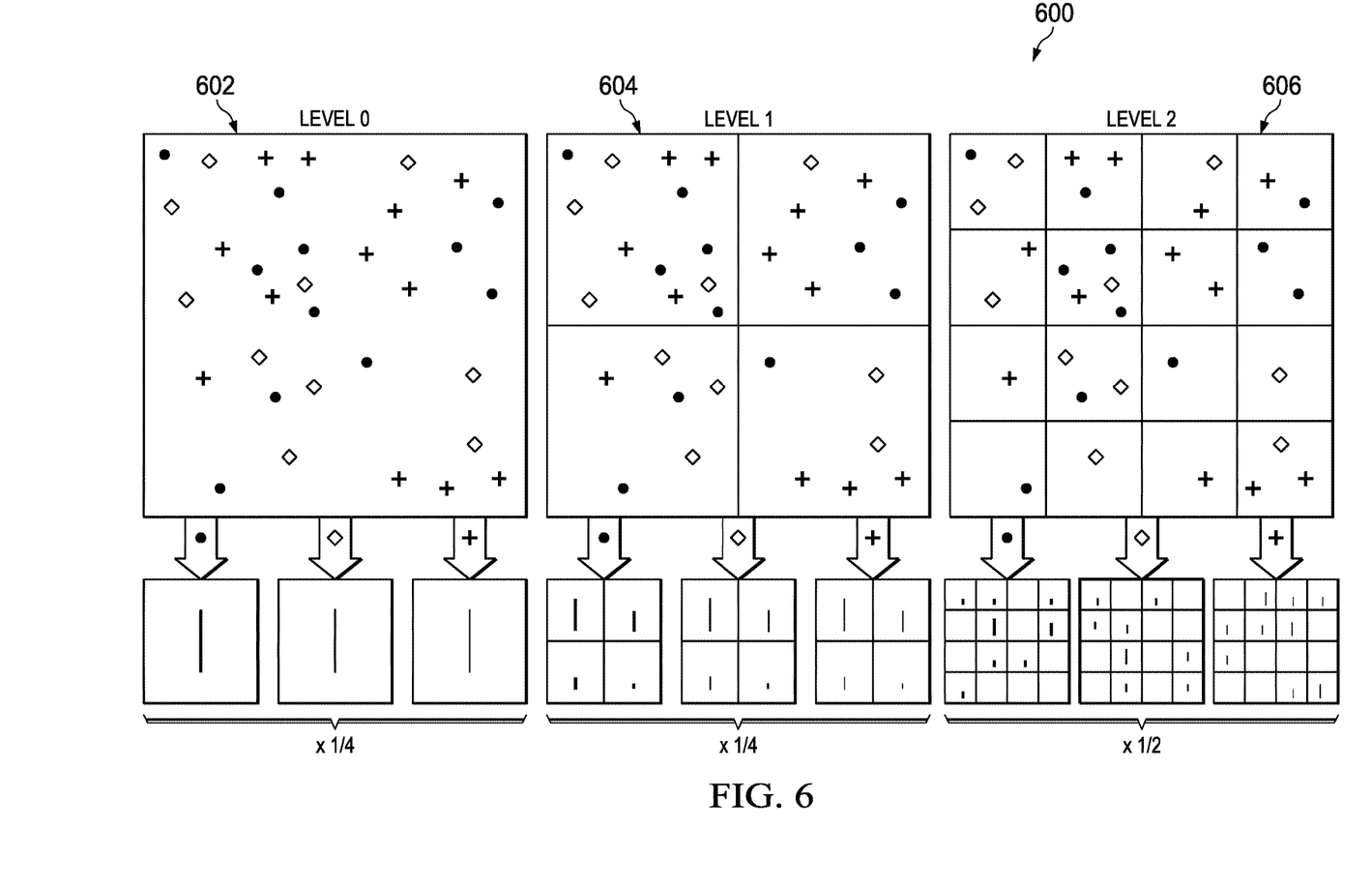
FIG. 6 is an illustration of spatial histograms generated from repeatedly dividing an image into regions with different levels in accordance with an illustrative embodiment.

Turning now to FIG. 6, an illustration of spatial histograms generated from repeatedly dividing an image into regions with different levels is depicted in accordance with an illustrative embodiment. In this depicted example, spatial histograms 600 are present for different levels of divisions of an image such as image 300 in FIG. 3. For example, spatial histogram 602 is for level 0 with a single region encompassing the entire image with no divisions. Spatial histogram 604 is for level 1 with the image divided into 4 regions, and spatial histogram 606 is for level 2 with the image divided into 16 regions.

As depicted, three different image terms are identified for the image. Each spatial histogram shows the count of each image term in each region.

Figure 9:
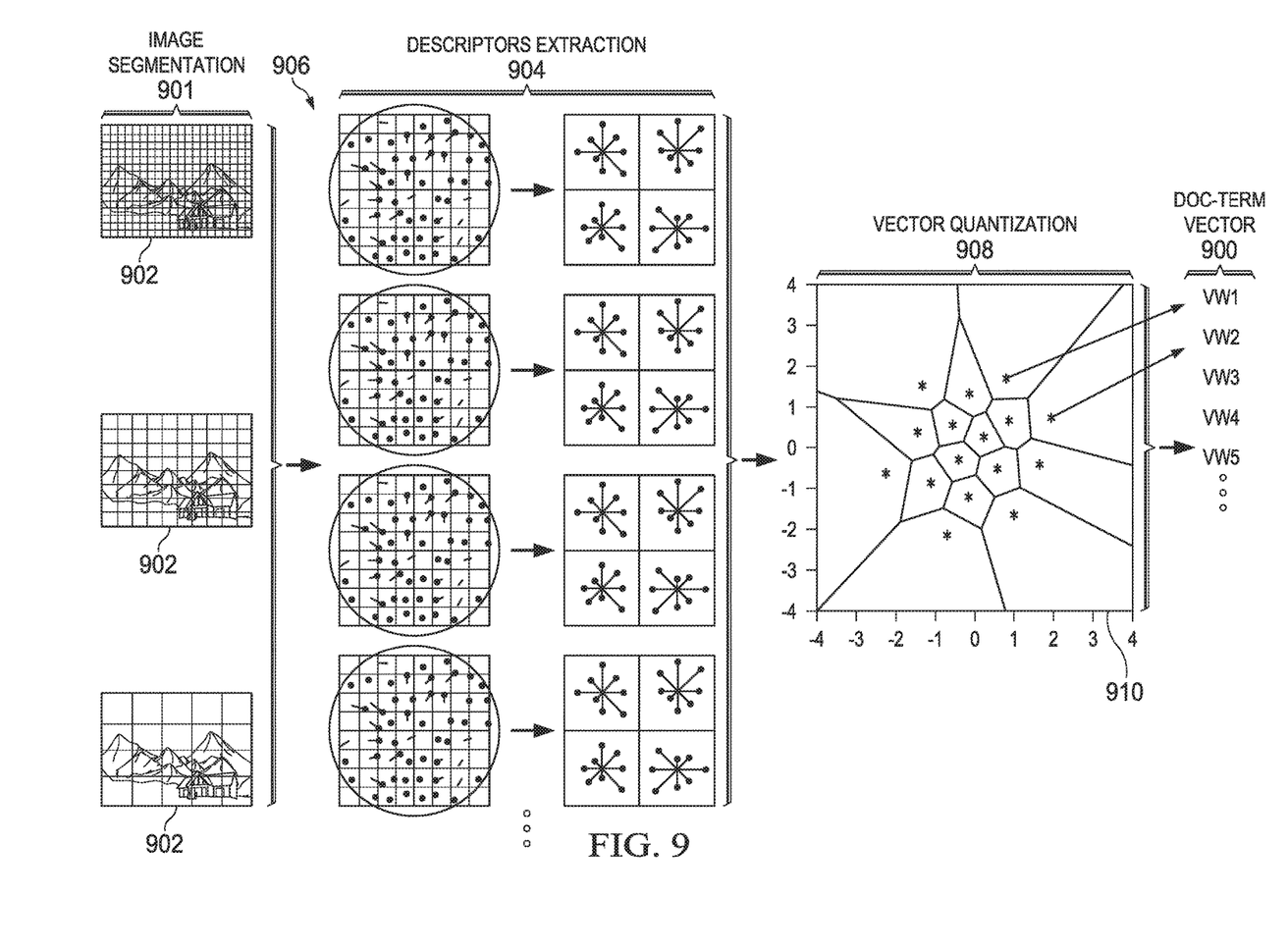
FIG. 9 is an illustration of data flow for creating a visual dictionary in accordance with an illustrative embodiment.

With reference next to FIG. 9, an illustration of data flow for creating a visual dictionary is depicted in accordance with an illustrative embodiment. Doc-term vector 900 is an example of image term structure 406 in FIG. 4, which may also be referred to as a visual dictionary.

Image segmentation 901 is performed on image 902, and is segmented 3 times in this example. Descriptors extraction 904 is performed to extract descriptors 906. Vector quantization 908 is performed on descriptors 906 to generate doc-term vector 900 for image 902, vector quantization 908 is performed using dictionary 910.

Figure 10:
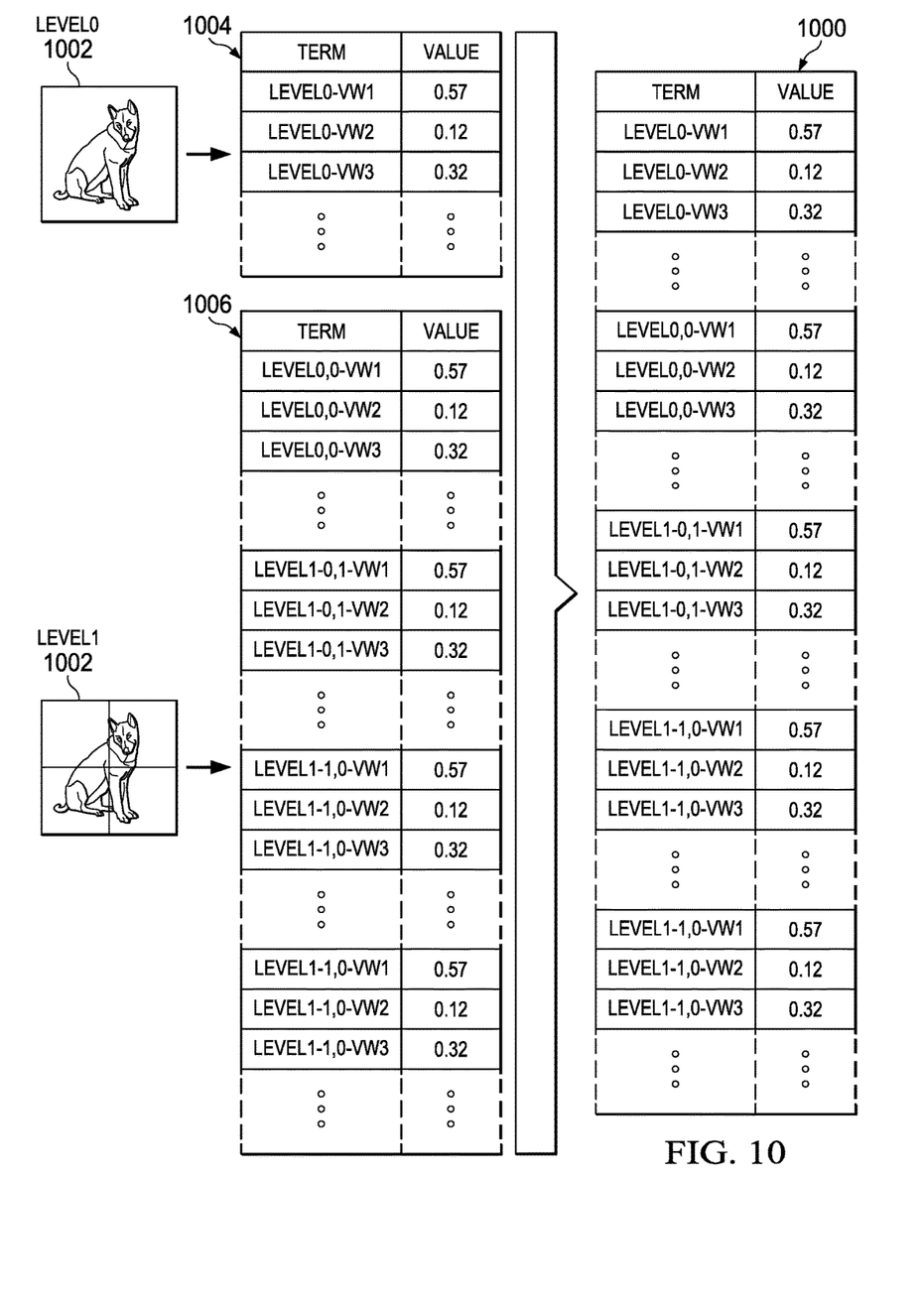
FIG. 10 is an illustration of dataflow used to generate a spatially augmented visual vector in accordance with illustrative embodiment.

Turning next to FIG. 10, an illustration of dataflow used to generate a spatially augmented visual vector is depicted in accordance with an illustrative embodiment. In this illustrative example, specially, augmented visual vector 1000 is generated from image 1002. Image 1002 has level 0 and level 1. At level 1, image 1002 is divided up into four regions. Image 1002 at level 0 is used to generate doc-term vector 1004. Image 1002 at level 1 is used to generate doc-term vector 1006. These two doc-term vectors are combined to form spatially augmented visual vector 1000.

Figure 11:
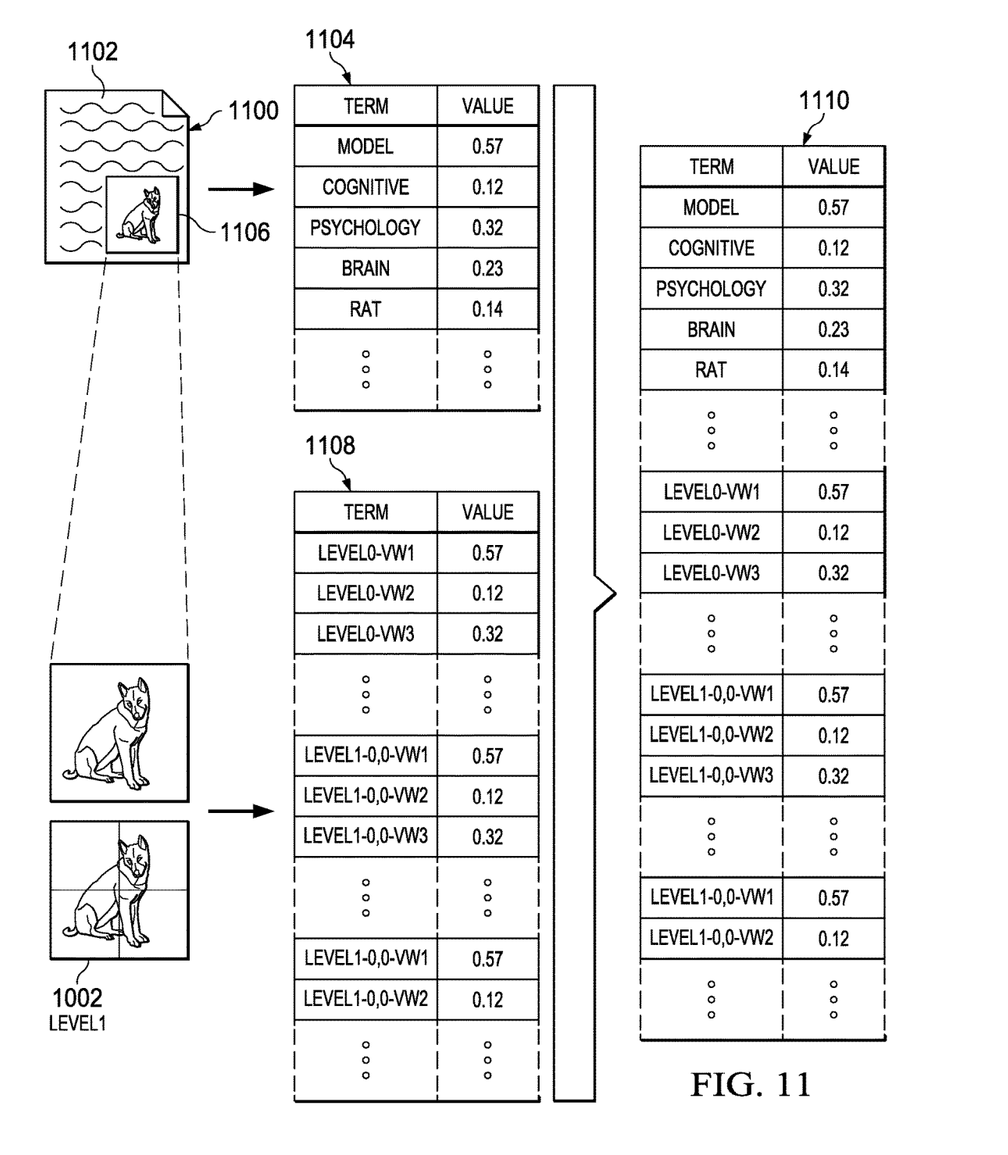
FIG. 11 is an illustration of data flow for generating a fused doc-term vector in accordance with an illustrative embodiment.

Next in FIG. 11, an illustration of data flow for generating a fused doc-term vector is depicted in accordance with an illustrative embodiment. In this example, text 1100 in document 1102 is used to generate doc-term vector 1104. Image 1106 in document 1102 is used to generate doc-term vector 1108. These two vectors are merged to form fused doc-term vector 1110, which contains terms for both document 1102 and image 1106. These vectors are ordered lists that are appended together.

Figure 7:
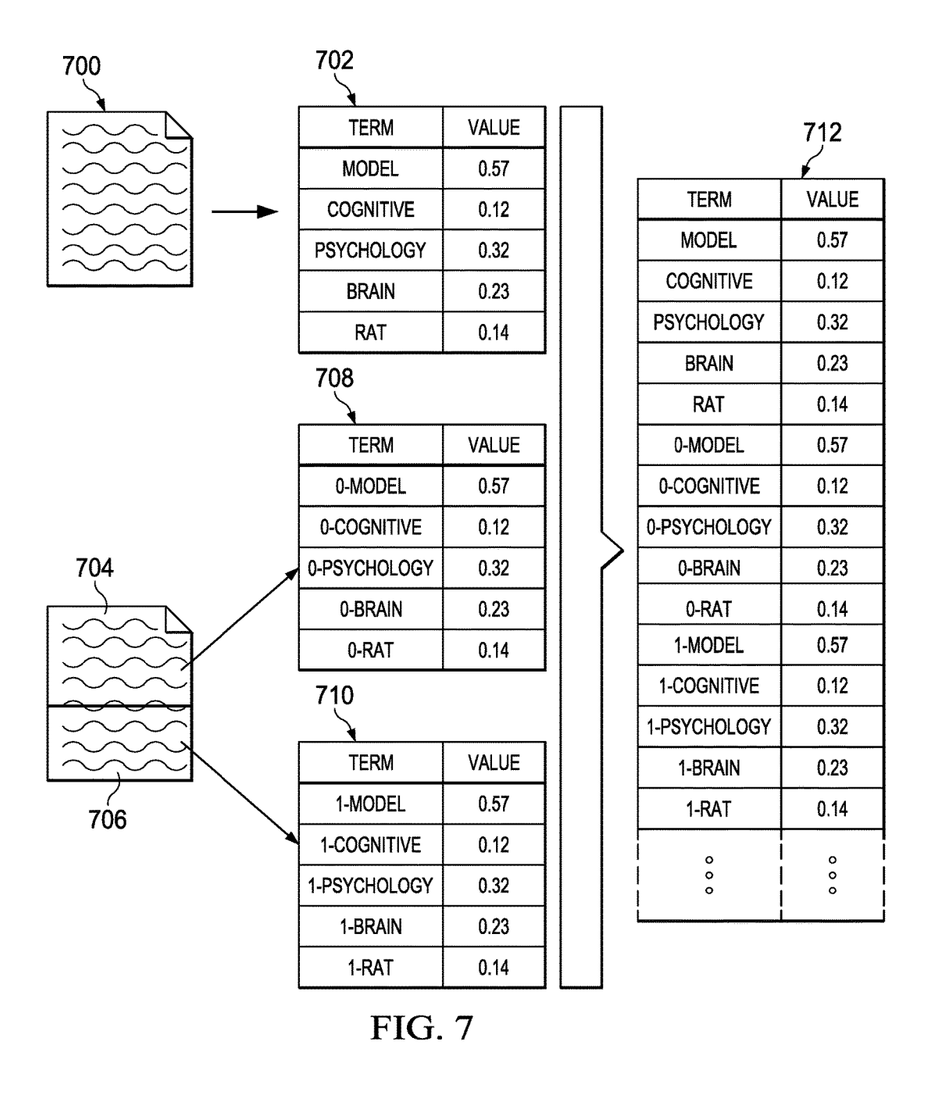
FIG. 7 is an illustration of dividing a document in sections to generate a spatially augmented text vector in accordance with an illustrative embodiment.
Figure 8:
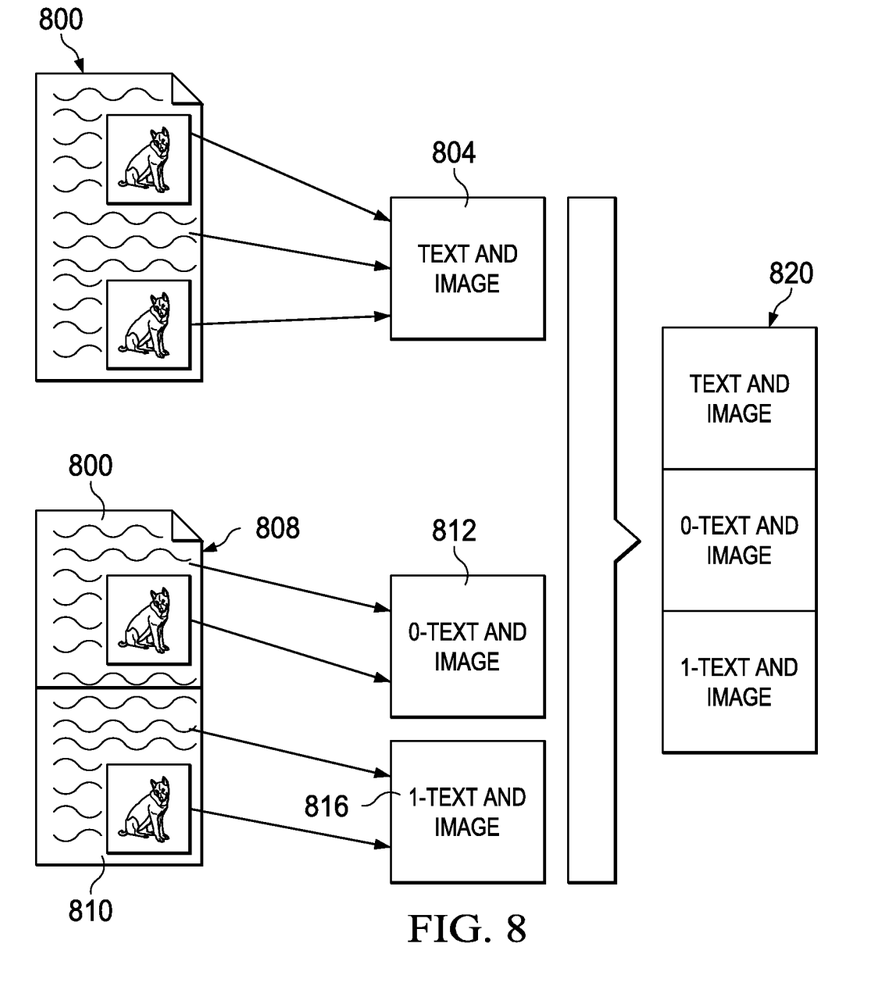
FIG. 8 is an illustration of dividing a document in sections to generate a spatially augmented text vector in accordance with an illustrative embodiment.

With reference now to FIG. 7 and FIG. 8, illustrations of dividing a document in sections to generate a spatially augmented text vector are depicted in accordance with an illustrative embodiment. Turning first to FIG. 7, dataflow for generating a spatially augmented text vector is depicted in accordance with in illustrative embodiment.

In this depicted example, document 700 is used to generate doc-term vector 702. Further, document 700 is divided into two sections, section 704 and section 706. These two sections are used to generate doc-term vector 708 and doc-term vector 710. In turn, doc-term vector 702, doc-term vector 708, and doc-term vector 710 are combined to form spatially augmented text vector 712.

Turning to FIG. 8, an illustration of combining dictionaries is depicted in accordance with an illustrative embodiment. The dictionaries are formed from templates in which counts are filled in for the doc-term vectors. In this illustrative example, document 800 is used to generate text and image doc-term vector 804. This doc-term vector in a combination of a word doc-term vector and an image doc-term vector.

Further, document 800 is divided into section 808 and section 810. These sections are used to generate text and image doc-term vector 812 and text and image doc-term vector 816. These doc-term vectors are fused to form fused doc-term vector 820.

In this manner, a document may be repeatedly divided into sections. Image terms and text terms may be repeatedly identified in the sections to form image term structures used to search a collection of documents.

Figure 12:
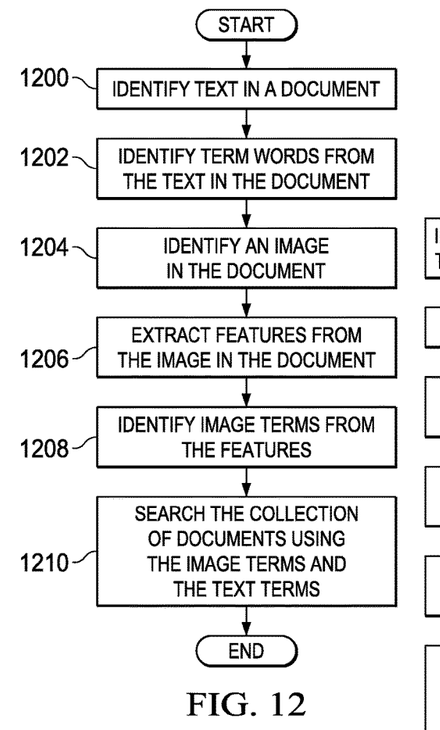
FIG. 12 is an illustration of a flowchart of a process for searching a collection of documents in accordance with an illustrative embodiment.

Turning next to FIG. 12, an illustration of a flowchart of a process for searching a collection of documents is depicted in accordance with an illustrative embodiment. The process illustrated in FIG. 12 is implemented in search system 100 shown in block form in FIG. 1. For example, the process may be implemented as program code in search system 100 in FIG. 1.

The process begins by identifying text in a document (step 1200). The process identifies text terms from the text in the document (step 1202).

The process also identifies an image in the document (step 1204). The process extracts features from the image in the document (step 1206). The process identifies image terms from the features (step 1208).

The process searches the collection of documents using the image terms and the text terms (step 1210). The process terminates thereafter. In step 1210, the search is performed using a technique for computing the distance between two doc-term vectors. The different image term structures in the form of doc-term vectors are compared and searched using the distance computation. The technique used may vary depending on the particular implementation. For example, a "cosine distance" in which the dot-product of two vectors, normalized by their length, is used.

Figure 13:
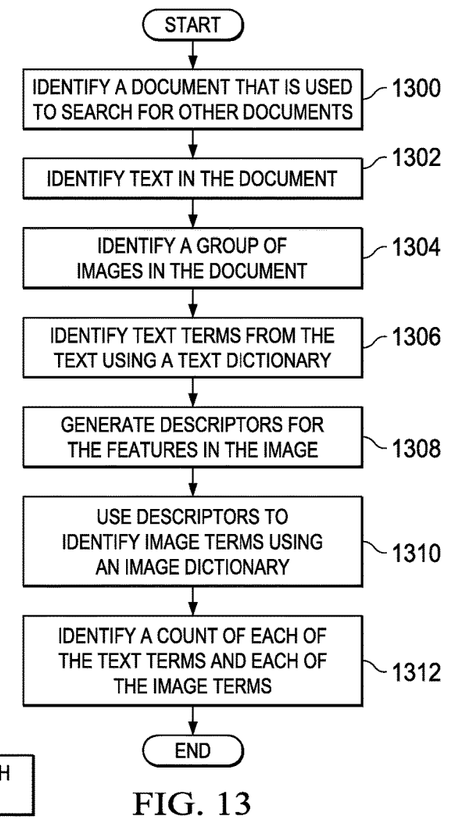
FIG. 13 is an illustration of a flowchart of a process for searching documents for text and images in accordance with an illustrative embodiment.

Turning to FIG. 13, an illustration of a flowchart of a process for searching documents for text and images is depicted in accordance with an illustrative embodiment. The process illustrated in FIG. 13 is implemented in search system 100 shown in block form in FIG. 1. For example, the process may be implemented as program code in search system 100 in FIG. 1.

The process begins by identifying a document that is used to search for other documents (step 1300). The process identifies text in the document (step 1302). The process also identifies a group of images in the document (step 1304).

The process identifies text terms from the text using a text dictionary (step 1306). In the illustrative example, if a text term is not present in the dictionary, the text term is identified as being "unrecognized" rather than being matched to a term in the dictionary.

As depicted, the process generates descriptors for the features in the image (step 1308). The descriptors may be, for example, scale-invariant feature transform (SIFT) descriptors. The descriptors are used to identify image terms using an image dictionary (step 1310). In step 1310, an image term is identified from a descriptor by using the dictionary term that most closely matches the descriptor as the image term in the image dictionary.

The text terms and the image terms form search terms. These search terms are placed into an image term structure, such as a doc-term vector. In turn, the doc-term vector is used for searching. The process identifies a count of each of the text terms and each of the image terms (step 1312) with the process terminating thereafter.

Figure 14:
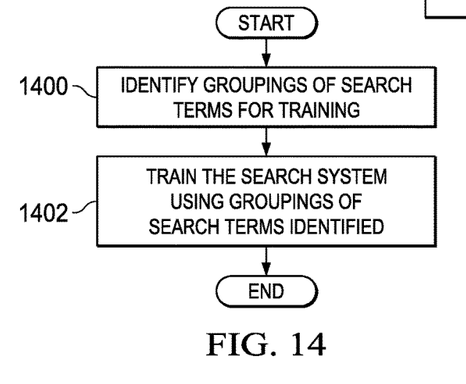
FIG. 14 is an illustration of a flowchart of a process for training search systems in accordance with an illustrative embodiment.

With reference next to FIG. 14, an illustration of a flowchart of a process for training search systems is depicted in accordance with an illustrative embodiment. The process is implemented in search system 100 in FIG. 1.

The process begins by identifying groupings of search terms for training (step 1400). The groupings of search terms include examples of documents that contain what is to be searched and negative examples of what is to be avoided.

The process trains the search system using groupings of search terms identified (step 1402). The process terminates thereafter.

In one illustrative example, a search system includes learning models such as a support vector machine (SVM). The support vector machines (SVM) may be trained using a Pyramid Match Kernel, which evaluates the distance between two vectors as the sum of the minimum value at each element. Each resulting support vector machine (SVM) is tested on a small validation sample of documents. The support vector machine (SVM), which performs best on the validation set, is chosen for that category. This process is known as the Bucket of Models algorithm.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in FIG. 12, the process may identify more than one image. As another example, step 1200 and step 1204 may be performed in parallel. As another example, although text dictionaries and image dictionaries are used in the process in FIG. 13, a single dictionary containing both text terms and image terms may be used in other illustrative examples.

Figure 15:
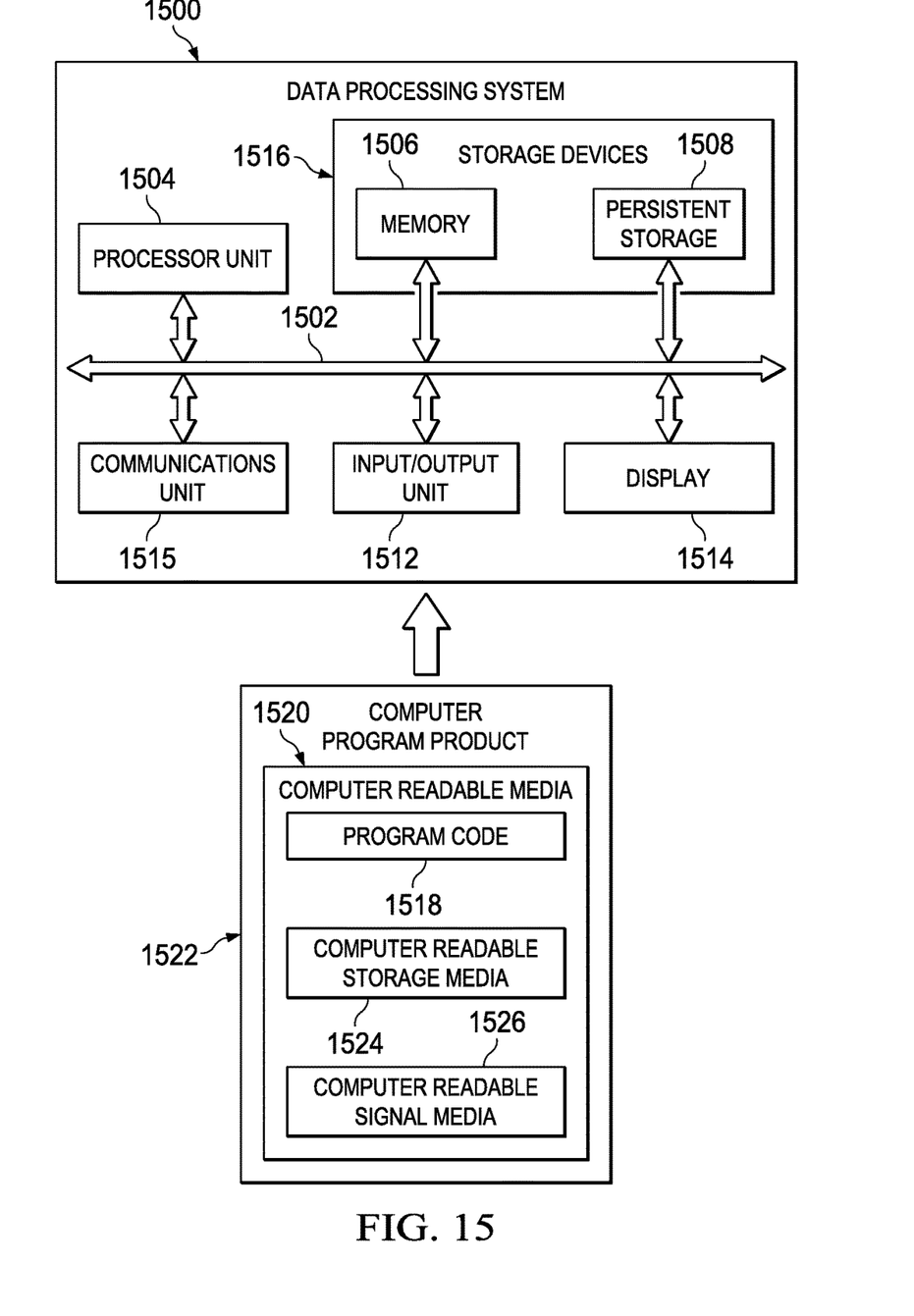
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement computer system 132 in FIG. 1. In this illustrative example, data processing system 1500 includes communications framework 1502, which provides communications between processor unit 1504, memory 1506, persistent storage 1508, communications unit 1510, input/output unit 1512, and display 1514. In this example, communication framework may take the form of a bus system.

Processor unit 1504 serves to execute instructions for software that may be loaded into memory 1506. Processor unit 1504 may be a number of processors such as a multi-processor core, or some other type of processor, depending on the particular implementation.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a solid state hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communication with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least one of a keyboard, a mouse, or some other suitable type of input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer-readable program code that may be read and executed by a processor in processor unit 1504. The program code in the different embodiments may be embodied on different physical or computer readable storage media, such as memory 1006 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these illustrative examples. In one example, computer-readable media 1520 may be computer-readable storage media 1524 or computer-readable signal media 1526. In these illustrative examples, computer-readable storage media 1524 is a physical or tangible storage device used to store program code 1518 rather than a medium that propagates or transmits program code 1518.

Alternatively, program code 1518 may be transferred to data processing system 1500 using computer-readable signal media 1526. Computer-readable signal media 1526 may be, for example, a propagated data signal containing program code 1518. For example, computer-readable signal media 1526 may be at least one of an electromagnetic signal, an optical signal, or any other suitable type of signal. These signals may be transmitted over at least one of communications links (such as wireless communications links), optical fiber cables, coaxial cables, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 may be varied from the illustrative examples shown. The different embodiments may be implemented using any hardware device or system capable of running program code 1518.

Thus, the illustrative examples provide a method and apparatus for searching a collection of documents using both images and text. In the illustrative examples, both images and text are converted into terms that can be searched using searching techniques for terms. One or more of the illustrative examples provide a technical solution that overcomes current issues when using a document or other data structure that contains text and one or more images to search for other documents or data structures.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. For example, the use of search terms, containing both text terms and image terms, may be used in conjunction with other searching techniques such as text only searching techniques. Thus, the illustrative examples may be used with other searching techniques to provide for hybrid searching systems.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A computer-implement method for searching a collection of documents comprising:
   identifying, by one or more processors, text in a document and text terms from the text;
   identifying, by one or more processors, an image in the document;
   extracting, by one or more processors, features in the image in the document, wherein the features are described using descriptor vectors;
   identifying, by one or more processors, image terms for the features by comparing descriptor vectors for the features to descriptor vectors representing features in a dictionary;
   transforming, by one or more processors, the image into image terms;
   combining, by one or more processors, the text terms and the image terms to form search terms; and
   searching, by one or more processors, the collection of documents for images in conjunction with text using text-only searching processes.

2. The method of claim 1, wherein the image has a spatial structure and wherein extracting the features in the image in the document comprises:
   dividing, by one or more processors, the image into regions, wherein pixels in the regions form the features.

3. The method of claim 2 further comprising:
   repeatedly dividing, by one or more processors, the image into the regions for different region sizes; and
   repeatedly identifying, by one or more processors, the image terms using different region sizes.

4. The method of claim 1 further comprising:
   repeatedly dividing, by one or more processors, the text terms and image terms into sections.

5. The method of claim 3, wherein the different region sizes form a spatial structure in which a term count for the image is based on the image terms located in each of the regions.

6. The method of claim 2, wherein identifying the image terms from the features comprises:
   performing, by one or more processors, vector quantization for the features to identify the image terms.

7. The method of claim 3, wherein extracting the features in the image in the document comprises:
   creating, by one or more processors, a group of descriptors for each region in the different region sizes.

8. The method of claim 7, wherein the group of descriptors for a region form an initial image term for the region.

9. The method of claim 8, wherein the initial image term for the region is identified from the dictionary of image terms using the initial image term.

10. The method of claim 1 further comprising:
    repeatedly dividing, by one or more processors, the document into sections; and
    repeatedly identify, by one or more processors, the image terms and text terms in the sections to form image term structures used to search the collection of documents.

11. A computer system for searching a collection of documents, computer system comprising:
    a bus system;
    a storage device connected to the bus system, wherein the storage device stores program instructions;
    a processor unit; and
    a search engine, running on the processor unit, wherein the search engine:
      identifies text in a document and text terms from the text;
      identifies an image in the document;
      extracts features in an image in the document, wherein the features are described using descriptor vectors;
      identifies image terms for the features by comparing descriptor vectors for the features to descriptor vectors representing features in a dictionary;
      transforms the image into image terms;
      combines the text terms and the image terms to form search terms; and
      searches a collection of documents utilizing the search terms to search for images in conjunction with text using text-only searching processes.

12. The computer system of claim 11, wherein in extracting the features in the image in the document, the search engine divides the image into regions, wherein pixels in the regions form the features.

13. The computer system of claim 12, wherein the search engine repeatedly dividing the image into the regions for different region sizes and repeatedly identifying the image terms for the features using the different region sizes.

14. The computer system of claim 13, wherein the different region sizes form a spatial structure in which a term count for the image is based on the text terms located in each of the regions.

15. The computer system of claim 12, wherein in identifying the image terms for the features, the search engine performs vector quantization for the features to identify the image terms.

16. The computer system of claim 13, wherein in extracting the features in the image in the document, the search engine creates a group of descriptors for each region in the different region sizes.

17. The computer system of claim 16, wherein the group of descriptors for each region form an initial image term for the regions.

18. The computer system of claim 17, wherein the initial image term for the regions is identified from the dictionary of image terms using the initial image term.

19. A computer program product for searching a collection of documents, the computer program product comprising:
- a non-transitory computer-readable storage media;
- a first program code, stored on the computer-readable storage media, for identifying text in a document and text terms from the text;
- a second program code, stored on the computer-readable storage media, for identifying an image in the document;
- a third program code, stored on the computer-readable storage media, for extracting features in the image in the document, wherein the features are described using descriptor vectors;
- a fourth program code, stored on the computer-readable storage media, for identifying image terms for the features by comparing descriptor vectors for the features to descriptor vectors representing features in a dictionary;
- a fifth program code, stored on the computer-readable storage media, for transforming the image into image terms;
- a sixth program code, stored on the computer-readable storage media, for combining, by one or more processors, the text terms and the image terms to form search terms; and
- a seventh program code, stored on the computer-readable storage media, for searching the collection of documents utilizing the search terms to search for images in conjunction with text using text-only searching processes.

20. The computer program product of claim 19, wherein the third program code comprises:
- a program code, stored on the computer-readable storage media, for dividing the image into regions, wherein pixels in the regions form the features.

21. The computer program product of claim 20 further comprising:
- an eighth program code, stored on the computer-readable storage media, for repeatedly dividing the image into the regions for different regions sizes; and
- a ninth program code, stored on the computer-readable storage media, for repeatedly identifying the image terms using the different region sizes.

22. The method of claim 1, wherein features in the image are described by scale-invariant feature transform (SIFT) descriptors, and wherein the image terms are identified using centroids of SIFT descriptor clusters.

23. The computer system of claim 11, wherein features in the image are described by scale-invariant feature transform (SIFT) descriptors, and wherein the image terms are identified using centroids of SIFT descriptor clusters.

24. The computer program product of claim 19, wherein features in the image are described by scale-invariant feature transform (SIFT) descriptors, and wherein the image terms are identified using centroids of SIFT descriptor clusters.

\* \* \* \* \*